United States Patent
Lee et al.

(10) Patent No.: US 11,158,241 B2
(45) Date of Patent: Oct. 26, 2021

(54) DISPLAY DEVICE AND A METHOD FOR DRIVING THE SAME

(71) Applicant: SAMSUNG DISPLAY CO., LTD., Yongin-si (KR)

(72) Inventors: Dong Gyu Lee, Yongin-si (KR); Seung Jae Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/744,589

(22) Filed: Jan. 16, 2020

(65) Prior Publication Data
US 2020/0265778 A1 Aug. 20, 2020

(30) Foreign Application Priority Data
Feb. 15, 2019 (KR) .......................... 10-2019-0018072

(51) Int. Cl.
*G09G 3/32* (2016.01)
*G06F 1/32* (2019.01)

(52) U.S. Cl.
CPC ................. *G09G 3/32* (2013.01); *G06F 1/32* (2013.01); *G09G 2310/02* (2013.01); *G09G 2330/021* (2013.01)

(58) Field of Classification Search
CPC . G09G 3/32; G09G 2310/02; G09G 2330/021
USPC ....................................................... 345/214
See application file for complete search history.

(56) References Cited

U.S. PATENT DOCUMENTS

| | | | |
|---|---|---|---|
| 9,508,276 B2 | 11/2016 | Hirakata et al. | |
| 10,235,952 B2 | 3/2019 | Amirkhany | |
| 2014/0022220 A1* | 1/2014 | Lee | G09G 3/20 345/204 |
| 2014/0085276 A1* | 3/2014 | Jang | G09G 3/20 345/204 |
| 2017/0004789 A1* | 1/2017 | Takashimizu | G09G 5/14 |
| 2018/0018927 A1* | 1/2018 | Amirkhany | G09G 5/006 |
| 2019/0378458 A1 | 12/2019 | Lee et al. | |

FOREIGN PATENT DOCUMENTS

| | | |
|---|---|---|
| KR | 10-2014-0002497 | 1/2014 |
| KR | 10-2018-0009692 | 1/2018 |
| KR | 10-2019-0139355 | 12/2019 |

* cited by examiner

*Primary Examiner* — Amare Mengistu
*Assistant Examiner* — Gloryvid Figueroa-Gibson
(74) *Attorney, Agent, or Firm* — F. Chau & Associates, LLC

(57) ABSTRACT

A display device including: an image determiner configured to determine whether a still image is displayed by comparing first partial image data that is a portion of image data of a previous frame with second partial image data that is a portion of image data of a current frame at a first time of a first mode in which a non-moving image is displayed, and determine whether the still image is displayed by comparing first frame data that is all image data of a previous frame with second frame data that is all image data of a current frame at a second time of a second mode in which a moving image is displayed; a display panel including pixels that receive a data signal corresponding to image data; and a panel driver configured to change a frequency at which the pixels are driven according to the first and second modes.

16 Claims, 10 Drawing Sheets

DISPLAY DEVICE AND A METHOD FOR DRIVING THE SAME

CROSS-REFERENCE TO RELATED APPLICATION

The present application claims priority under 35 U.S.C. § 119(a) to Korean patent application no. 10-2019-0018072 filed on Feb. 15, 2019 in the Korean Intellectual Property Office, the disclosure of which is incorporated by reference herein in its entirety.

1. Technical Field

The present inventive concept relates to an electronic device, and more particularly, to a display device and a method for driving the same.

2. Related Art

A display device displays an image on a display panel in response to control signals applied from outside the display device.

The display device includes a plurality of pixels. Each of the pixels includes a plurality of transistors, and a light emitting device and a capacitor, which are electrically coupled to the transistors. The transistors are respectively turned on in response to signals provided through gate or scan lines, to generate a driving current. The light emitting device emits light corresponding to the driving current generated by the transistors.

To increase the driving efficiency of a display device, the display device should consume low power. The power consumption of a display device may be reduced by decreasing a driving frequency in a still image display.

SUMMARY

In accordance with an exemplary embodiment of the present inventive concept, there is provided a display device including: an image determiner configured to receive image data in frames, determine whether a still image is displayed by comparing first partial image data that is a portion of image data of a previous frame with second partial image data that is a portion of image data of a current frame at a first time of a first mode in which a non-moving image is displayed, and determine whether the still image is displayed by comparing first frame data that is all image data of a previous frame with second frame data that is all image data of a current frame at a second time of a second mode in which a moving image is displayed; a display panel including pixels that receive a data signal corresponding to the image data received by the image determiner; and a panel driver configured to change a frequency at which the pixels are driven according to the first and second modes.

The display panel may include n (n is a natural number) pixel lines. The first partial image data and the second partial image data may correspond to first to kth (k is a natural number smaller than n) pixel lines.

The first partial image data and the second partial age data may correspond to a first pixel line.

The display panel may include n (n is a natural number) pixels. The first partial image data and the second partial image data may correspond to first to kth (k is a natural number smaller than n) pixels.

When the first partial image data and the second partial image data are different from each other in the first mode, the image determiner may switch the first mode to the second mode, and the panel driver may delay the second frame data for a predetermined time.

The panel driver may increase an output frequency of at least some of a plurality of scan signals applied to each of the pixels in the second mode.

A time at which the second mode is activated and a start time at which an image corresponding to the second frame data is displayed may be synchronized with each other.

When the first partial image data and the second partial image data are equal to each other in the first mode, the image determiner may determine whether the still image is displayed by comparing the first frame data and the second frame data at a second time of the first mode.

When the first frame data and the second frame data are different from each other in the first mode, the image determiner may switch the first mode to the second mode.

The first time may correspond to a time at which the second partial image data in the current frame is provided to the image determiner.

The second time may correspond to a time at which all of the second frame data are provided to the image determiner.

The image determiner may include: a checksum accumulator configured to accumulate a checksum of the image data of the current frames; a storage configured to store a checksum of the image data of the previous frames; a comparator configured to compare a checksum of the first partial image data with a checksum of the second partial image data at the first time of the first mode, and compare a checksum of the first frame data and a checksum of the second frame data at a second time of the first mode and the second time of the second mode; and a mode controller configured to output a still image flag for determining activation of the first mode or the second mode, based on the comparison result.

The panel driver may be driven in the first mode in response to an activation level of the still image flag and be driven in the second mode in response to an inactivation level of the still image flag.

The panel driver may include: a data driver configured to convert the image data into the data signal and provide the data signal to the display panel; a scan driver configured to provide a scan signal to the display panel at a first frequency in the first mode, and provide the scan signal to the display panel at a second frequency higher than the first frequency in the second mode; and a display delay configured to delay the supply of the second frame data to the data driver for a predetermined time in response to the comparison result of the first partial image data and the second partial image data.

The display delay may include a line buffer configured to receive the image data and provide the image data to the data driver.

In accordance with another exemplary embodiment of the present inventive concept, there is provided a method for driving a display device, the method including: comparing first partial image data that is a portion of image data of a previous frame with second partial image data that is a portion of image data of a current frame, at a first time of the current frame, in a first mode in which a still image is displayed; when the first partial image data and the second partial image data are different from each other, switching the first mode to a second mode in which a moving image is displayed, and delaying an image to be displayed by a predetermined time, wherein the image to be displayed corresponds to the current frame; and increasing a frequency of some scan signals applied to pixels, in the second mode.

The method may further include: when the first partial image data and the second partial image data are equal to each other, comparing first frame data that is all image data of the previous frame with second frame data that is all image data of the current frame at a second time of the current frame; when the first frame data and the second frame data are different from each other, displaying an image of a next frame by switching the first mode to the second mode; and when the first frame data and the second frame data are equal to each other, maintaining the first mode.

The first time may be a time at which data up to the second partial image data are received, and the second time may be a time at which all of the second frame data are received.

The method may further include: comparing first frame data that is all image data of the previous frame with second frame data that is all image data of the current frame at a second time, in the second mode; when the first frame data and the second frame data are different from each other, maintaining the second mode; and when the first frame data and the second frame data are equal to each other, switching the second mode to the first mode, and decreasing the frequency of some scan signals.

A display panel for displaying the image may include n (n is a natural number) pixel lines. The first partial image data and the second partial image data may correspond to first to kth (k is a natural number smaller than n) pixel lines.

In accordance with an exemplary embodiment of the inventive concept, there is provided a display device including: a display panel including pixels; an image determiner configured to compare first partial image data of a previous frame with second partial image data of a current frame, at a first time of the current frame, in a first mode in which a still image is displayed; switch the first mode to a second mode in which a moving image is displayed when the first partial image data and the second partial image data are different from each other, and delay an image of the current frame to be displayed by a predetermined time; and a driver configured to increase a frequency of first scan signals applied to the pixels, in the second mode.

When the first partial mage data and the second partial image data are different from each other, the frequency of the first scan signals is increased.

The predetermined time is a period from a time at which the supply of image data of the current frame is started to the first time.

In accordance with an exemplary embodiment of the inventive concept, there is provided a display device including: a display panel that includes pixels; an image determiner configured to determine whether a still image is displayed by comparing first partial image data of a previous frame with second partial image data a current frame, at a first time of a first mode in which a non-moving image is displayed, and determine whether the still image is displayed by comparing first frame data that includes all image data of a previous frame with second frame data that includes all image data of a current frame, at a second time of a second mode in which a moving image is displayed; and a driver configured to change a frequency at which the pixels are driven according to the first and second modes.

BRIEF DESCRIPTION OF THE DRAWINGS

The above and other features of the inventive concept will become more apparent by describing in detail exemplary embodiments thereof with reference to the accompanying drawings.

DETAILED DESCRIPTION OF THE EMBODIMENTS

Figure 1:
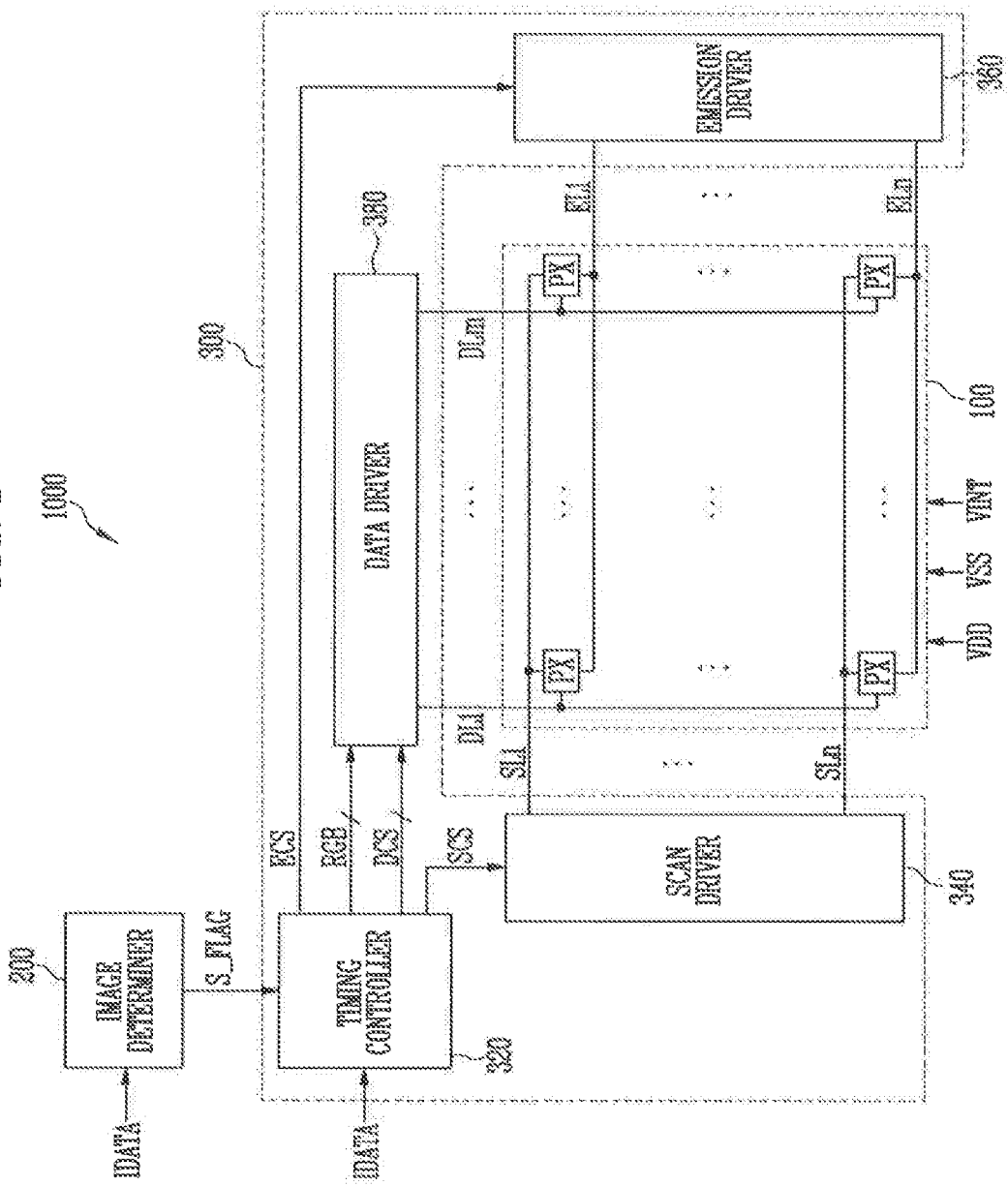
FIG. 1 is a block diagram illustrating a display device in accordance with an exemplary embodiment of the present inventive concept.

Hereinafter, exemplary embodiments of the present inventive concept will be described in more detail with reference to the accompanying drawings. The inventive concept may, however, be embodied in different forms and should not be construed as limited to the embodiments set forth herein.

Throughout the drawings, the same reference numerals may be given to the same elements, and their overlapping descriptions may be omitted. In the drawings, dimensions may be exaggerated for clarity of illustration.

It will be understood that when an element is referred to as being "between" two elements, it can be the only element between the two elements, or one or more intervening elements may also be present.

FIG. 1 is a block diagram illustrating a display device 1000 in accordance with an exemplary embodiment of the present inventive concept.

Referring to FIG. 1, the display device 1000 may include a display panel 100, an image determiner 200, and a panel driver 300.

In an exemplary embodiment of the inventive concept, the driving mode of the display device 1000 may be a low-power driving mode (or a low-frequency driving mode) (hereinafter, referred to as a first mode) and a normal driving mode (hereinafter, referred to as a second mode). The display device 1000 operates in the first mode or the second mode. The second mode is a driving mode in which the display panel 100 normally displays input image data. For example, a moving image may be displayed in the second mode.

The first mode is a mode in which the display device 1000 displays a still image. For example, when the display device 1000 is in a standby state, the display device 1000 may be driven in the first mode. The first mode may include a mode (e.g., an Always On Display (AOD) mode) in which basic display information is always displayed.

The display panel 100 may include a plurality of scan lines al to SLn, a plurality of emission control lines al to ELn, and a plurality of data lines DL1 to DLm. The display panel 100 may include a plurality of pixels PX respectively coupled to the scan lines SL1 to SLn, the emission control lines EL1 to ELn, and the data lines DL1 to DLm (n and m are integers greater than 1). Therefore, the display panel 100 may include n×m pixels PX. Each of the pixels PX may include a driving transistor and a plurality of switching transistors.

The pixels PX may be divided into pixel lines or rows respectively corresponding to the scan lines SL1 to SLn. For example, the display panel 100 may include n pixel lines.

Additionally, in an exemplary embodiment of the inventive concept, different scan lines for supplying scan signals having different timings may be coupled to one pixel PX (and one pixel line).

The image determiner 200 may receive image data IDATA provided in a frame unit. The image determiner 200 may determine whether a still image is displayed by analyzing the image data IDATA. The image determiner 200 may provide the panel driver 300 with a still image flag S_FLAG for changing a driving mode, corresponding to the image determination result.

In an exemplary embodiment of the inventive concept, image data IDATA respectively corresponding to the pixels PX from a pixel PX coupled to a first data line DL1 and a first scan line SL1 to a pixel PX coupled to an mth data line DLm and an nth scan line SLn may be supplied as serial data to the display device 100. For example, the image data IDATA may be serially supplied to the image determiner 200 and a timing controller 320. The image determiner 200 may analyze the image data IDATA as serial data.

In an exemplary embodiment of the inventive concept, in the first mode, the image determiner 200 may determine whether a still image is displayed by comparing first partial image data with second partial image data, at a first time of a current frame. The first partial image data is a portion of image data IDATA of a previous frame and the second partial image data is a portion of image data IDATA of a current frame that corresponds to the first partial image data.

In an exemplary embodiment of the inventive concept, the first and second partial image data may be data corresponding to first to kth (k is a natural number smaller than n) pixel lines. The first time may correspond to a time at which data up to data of the kth pixel line are provided to the image determiner 200.

In an exemplary embodiment of the inventive concept, the first and second partial image data may correspond to first to kth pixels. The first to kth pixels may be pixels corresponding to the sequence of image data IDATA provided in series. For example, each of the first and second partial image data may be image data of 2,000 pixels. The first time may correspond to a time at which data of a 2,000th pixel is provided to the image determiner 200.

When the first partial image data and the second partial image data are different from each other, the image determiner 200 may determine that an image of the current frame is different from an image of the previous frame. For example, the image of the current frame may be a moving image (or an image being scrolled). Accordingly, the driving mode of the display device 1000 can be immediately switched from the first mode to the second mode.

In an exemplary embodiment of the inventive concept, when the first partial image data and the second partial image data are equal to each other in the first mode, the image determiner 200 may determine once again whether a still image is displayed by comparing first frame data, which is the entire image data of the previous frame, with second frame data which is the entire image data of the current frame, at a second time of the current frame. For example, the second time may correspond to a time at which the entire image data of the current frame is provided to the image determiner 200. For example, the second time may be a time at which the entire second frame data is provided.

When the first frame data and the second frame data are equal to each other, the first mode may be maintained. When the frame data and the second frame data are different from each other, the driving mode of the display device 1000 may be switched to the second mode.

In an exemplary embodiment of the inventive concept, in the second mode, the image determiner 200 may determine whether a still image is displayed by comparing first frame data with the second frame data at a second time of a current frame. When the first frame data and the second frame data are equal to each other, the driving mode of the display device 1000 may be switched to the first mode. When the first frame data and the second frame data are different from each other, the second mode may be maintained.

In an exemplary embodiment of the inventive concept, the image determination operation of the image determiner 200 may be performed for each frame. However, this is merely illustrative, and the image determination operation may be performed in a predetermined frame unit.

The panel driver 300 may change a frequency at which the pixels PX are driven according to the first and second modes. For example, the output frequency of some scan signals may be decreased to reduce power consumption in the first mode in which a still image is displayed. In an exemplary embodiment of the inventive concept, the panel driver 300 may include the timing controller 320, a scan driver 340, an emission driver 360, and a data driver 380.

The timing controller 320 may control driving of the scan driver 340, the emission driver 360, and the data driver 380, based on timing signals supplied from the outside. In addition, the timing controller 320 may provide the data driver 380 with image data IDATA supplied from an external graphic source.

The timing controller 320 may supply a first control signal SCS including a scan start signal, a scan clock signal, and the like to the scan driver 310, and supply a second control signal ECS including an emission control start signal, an emission control clock signal, and the like to the emission driver 360. The timing controller 320 may supply a third control signal DCS including a source start signal, a source output enable signal, a source sampling clock, and the like to the data driver 380.

In an exemplary embodiment of the inventive concept, the timing controller 320 may control the output frequency of a scan signal according to the driving mode of the display device 1000. For example, an output frequency of the scan start signal in the first mode may be smaller than an output frequency of the scan start signal in the second mode. Accordingly, power consumption in the first mode in which a still image is displayed can be reduced. However, this is merely illustrative, and a method for decreasing the driving frequency in the first mode is not limited thereto.

The scan driver 340 may supply a scan signal to the scan lines SL1 to SLn in response to the first control signal SCS. In an exemplary embodiment of the inventive concept, the scan driver 340 may output a plurality of scan signals to one pixel PX. For example, different scan signals may be output to scan lines coupled to different components in a pixel PX. A plurality of different lines for the respective scan signals may be coupled to the pixel PX.

The emission driver 360 may supply an emission control signal to the pixels PX through the emission control lines EL1 to ELn, based on the second control signal ECS.

The data driver 380 may receive the third control signal DCS and an image data signal RGB from the timing controller 320. The data driver 380 may convert the image data signal RGB into an analog data signal (e.g., a data voltage), and provide the data signal to the display panel 100 through the data lines DL1 to DLm.

Although the image determiner 200, the scan driver 340, the emission driver 360, the data driver 380, and the timing controller 320 are components separate from each other as illustrated in FIG. 1, at least some of these components may be physically and/or functionally integrated.

In addition, the display device 1000 may further include a power supply configured to supply a first power source VDD, a second power source VSS, and a third power source VINT to the display panel 100. However, this is merely illustrative, and at least one of the first power source VDD, the second power source VSS, and the third power source VINT may be supplied from the timing controller 320 or the data driver 380.

Figure 2:
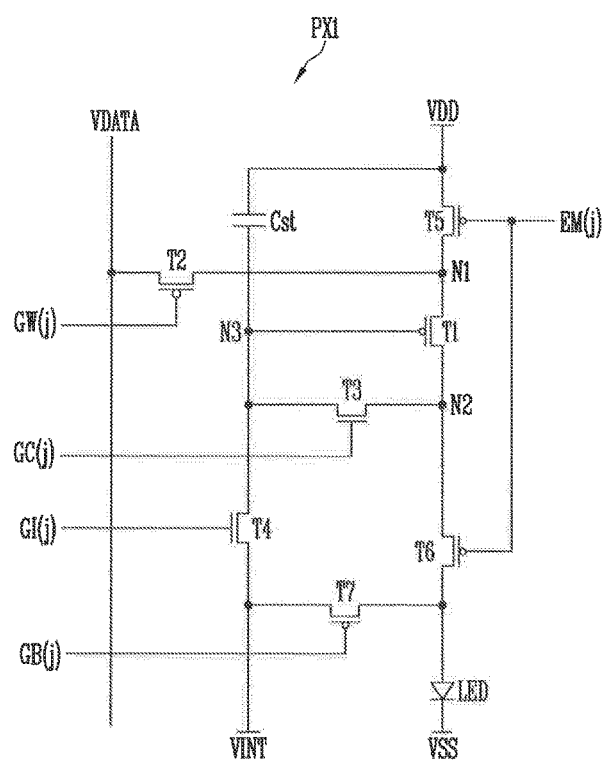
FIG. 2 is a circuit diagram illustrating a pixel included in the display device shown in FIG. 1, according to an exemplary embodiment of the inventive concept.

FIG. 2 is a circuit diagram illustrating one of the pixels PX included in the display device 1000 shown in FIG. 1.

Referring to FIGS. 1 and 2, a pixel PX1 may include a light emitting device LED and a plurality of transistors T1, T2, T3, T4, T5, T6 and T7.

The pixel PX1 shown in FIG. 2 is a pixel disposed on a jth row and an ith column (i and j are natural numbers).

A first electrode of the light emitting device LED may be connected to a sixth transistor T6, and a second electrode of the light emitting device LED may be coupled to the second power source VSS. The light emitting device LED may include an organic light emitting diode or an inorganic light emitting diode. The light emitting device LED may generate light with a predetermined luminance corresponding to a driving current supplied from the first transistor T1.

A first transistor T1 may be coupled between a first node N1 electrically coupled to the first power source VDD and a second node N2 electrically coupled to the first electrode of the light emitting device LED. The first transistor T1 may generate a driving current and provide the driving current to the light emitting device LED. A gate electrode of the first transistor T1 may be coupled to a third node N3. The first transistor T1 may be a driving transistor of the pixel PX1.

A second transistor T2 may be coupled between a data line and the first node N1. The second transistor T2 may include a gate electrode for receiving a write scan signal GW(j).

A third transistor T3 may be coupled between the second node N2 and the third node N3. The third transistor T3 may include a gate electrode for receiving a compensation scan signal GC(j). The first transistor T1 may be diode-coupled when the third transistor T3 is turned on. In other words, the third transistor T3 may function to write a data voltage VDATA with respect to the first transistor T1 and compensate a threshold voltage of the first transistor T1.

A storage capacitor Cst may be coupled between the first power source VDD and the third node N1 The storage capacitor Cst may store a voltage corresponding to the data voltage VDATA and the threshold voltage of the first transistor T1.

A fourth transistor T4 may be coupled between the third node N3 and the third power source VINT. The fourth transistor T4 may include a gate electrode for receiving an initialization scan signal GI(j). In an exemplary embodiment of the inventive concept, the initialization scan signal GI(j) may correspond to a compensation scan signal GC(j−1) of a previous pixel line. When the fourth transistor T4 is turned on, a gate voltage of the first transistor T1 may be initialized to the voltage of the third power source VINT. In an exemplary embodiment of the inventive concept, the third power source VINT may be set to a voltage lower than the lowest voltage of the data voltage VDATA.

A fifth transistor T5 may be coupled between the first power source VDD and the first node N1. The fifth transistor T5 may include a gate electrode for receiving an emission control signal EM(j).

The sixth transistor T6 may be coupled between the second node N2 and the first electrode of the light emitting device LED. The sixth transistor T6 may include a gate electrode for receiving the emission control signal EM(j).

The fifth and sixth transistors T5 and T6 may be turned on in a gate-on period of the emission control signal EM(j), and be turned off in a gate-off period of the emission control signal EM(j).

A seventh transistor T7 may be coupled between the third power source VINT and the first electrode of the light emitting device LED. The seventh transistor T7 may include a gate electrode for receiving a bypass scan signal GB(j). In an exemplary embodiment of the inventive concept, the bypass scan signal GB(j) may correspond to the write scan signal GW(j). However, this is merely illustrative, and the bypass scan signal GB(j) may correspond to a write scan signal GW(j−1) supplied to a previous pixel row or a write scan signal GW(j+1) supplied to a next pixel row.

It is to be understood that the write scan signal GW(j), the compensation scan signal GC(j), the initialization scan signal GI(j), and the bypass scan signal GB(j) are expressions for distinguishing scan signals provided to different components in the pixel PX1 for convenience of description, and thus, do not restrict functions of the respective scan signals.

In an exemplary embodiment of the inventive concept, each of the first, second, fifth, sixth, and seventh transistors T1, T2, T5, T6, and T7 may be implemented with a P-type Low-Temperature Poly-Silicon (LTPS) thin film transistor, and the third and fourth transistors T3 and T4 may be implemented with an N-type oxide semiconductor thin film transistor. The third and fourth transistors T3 and T4, which may serve as switching transistors, may be implemented with the N-type oxide semiconductor thin film transistor, since the N-type oxide semiconductor thin film transistor has excellent current leakage characteristics as compared with the P-type LTPS thin film transistor.

Accordingly, leakage current in the third and fourth transistors T3 and T4 can be considerably decreased, and pixel driving and image display can be performed at a low frequency of less than 30 Hz. In other words, power consumption can be reduced in the first mode.

Figure 3:
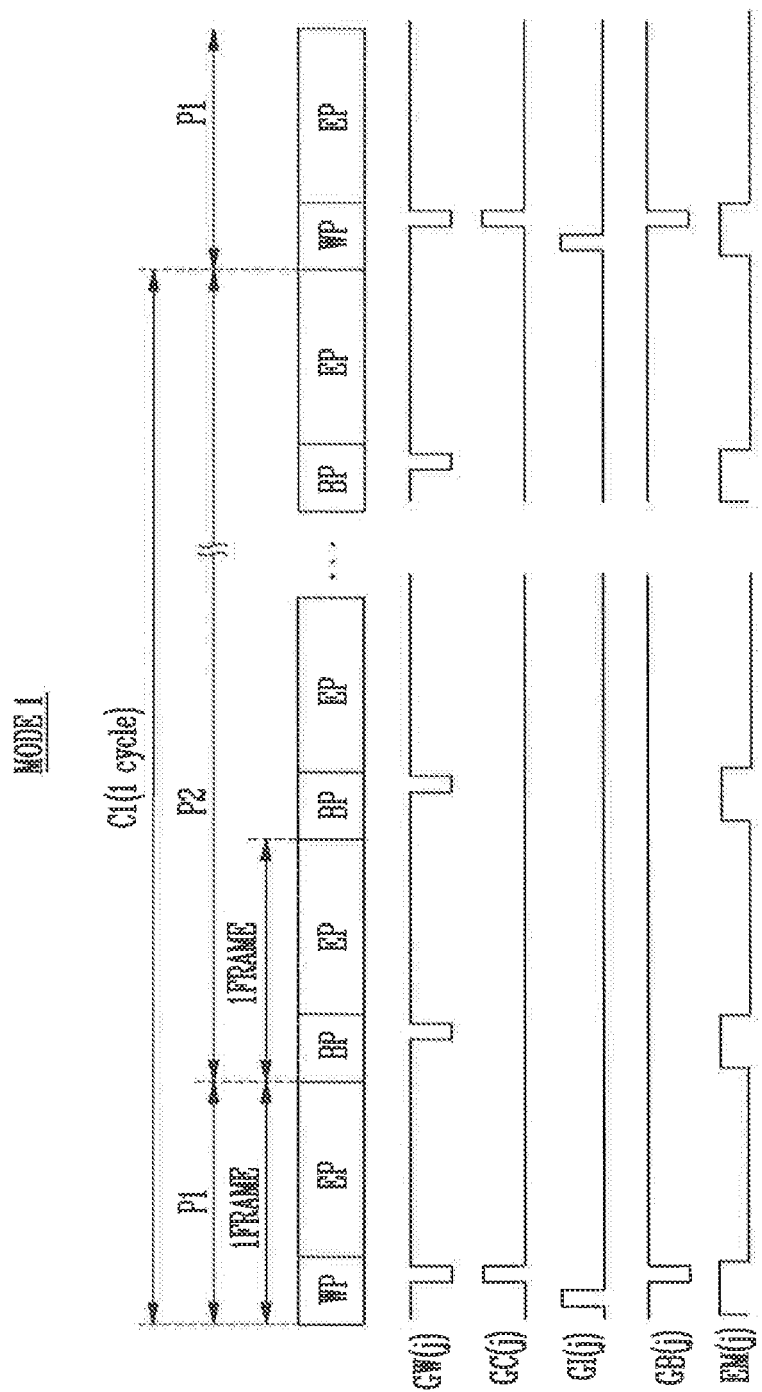
FIG. 3 is a diagram illustrating driving the display device shown in FIG. 1, according to an exemplary embodiment of the inventive concept.

FIG. 3 is a diagram illustrating driving the display device 1000 shown in FIG. 1, according to an exemplary embodiment of the inventive concept.

Referring to FIGS. 1 to 3, the display device 1000 may operate in the first mode in which a still image is displayed.

FIG. 3 illustrates a case in which the pixel PX1 included in a jth row is driven in a first mode MODE1. As shown in FIG. 3, in the first mode MODE1, the display device 1000 may operate while repeating a first cycle C1 that includes a first period P1 corresponding to one frame period and a second period P2 including a plurality of consecutive frame periods.

The first period P1 may include a data write period WP and an emission period EP. Each frame period of the second period P2 may include a bias period BP and an emission period EP.

The data write period WP may be a period in which the second and third transistors T2 and T3 are turned on such that the data voltage VDATA is stored in the storage capacitor Cst. The bias period BP may be a period in which only the second transistor T2 is turned on to supply a predetermined voltage (or a data voltage VDATA of a corresponding frame) to a source electrode of the first transistor T1. In this case, an on-bias state of the first transistor T1 is held. Accordingly, it will be understood that the first period P1 is a write period and the second period P2 is a holding period.

In the first mode MODE1, the first pixel PX1 may emit light with a grayscale corresponding to the data voltage VDATA written in the data write period WP during the first cycle C1. For example, the first cycle C1 may be set to 60 Hz, and include 60 frame periods. The second period P2 may have 59 frame periods. In other words, the pixel PX1 may emit light during the 60 frame periods, based on a data voltage VDATA written in a data write period WP of one frame period.

In an exemplary embodiment of the inventive concept, in the second period P2, only the write scan signal GW(j) is applied, and the other scan signals GC(j), GI(j), and GB(j) are not supplied. For example, their levels are kept steady. Therefore, power for supply scan signals is not consumed. For example, when the first cycle C1 is set to 60 Hz, the compensation scan signal GC(j), the initialization scan signal GI(j), and the bypass scan signal GB(j) may be output at 1 Hz in the first mode MODE1. Therefore, driving for outputting the compensation scan signal GC(j), the initialization scan signal GI(j), and the bypass scan signal GB(j) may also be performed at 1 Hz. However, this is merely illustrative, and the compensation scan signal GC(j), the initialization scan signal GI(j), and the bypass scan signal GB(j) may be output at a low frequency of 20 Hz or less.

A gate-on level of each of the write scan signal GW(j), the compensation scan signal GC(j), the initialization scan signal GI(j), and the bypass scan signal GB(j) may correspond to the type of a transistor they are applied to. In other words, the gate-on level of a scan signal supplied to P-type transistors may be a logic low level, and the gate-on level of a scan signal supplied to N-type transistors may be a logic high level.

Additionally, in a second mode in which a moving image is displayed, all of the write scan signal GW(j), the compensation scan signal GC(j), the initialization scan signal GI(j), and the bypass scan signal GB(j) may be output at the same frequency. For example, when an image is displayed at 60 Hz, the write scan signal GW(j), the compensation scan signal GC(j), the initialization scan signal GI(j), and the bypass scan signal GB(j) may be output at 60 Hz.

However, this is merely illustrative, and a low-frequency driving method in the first mode MODE1 for reducing power consumption and a pixel configuration corresponding thereto are not limited thereto. For example, the low-frequency driving method for displaying a still image may be implemented by various methods.

Figure 4:
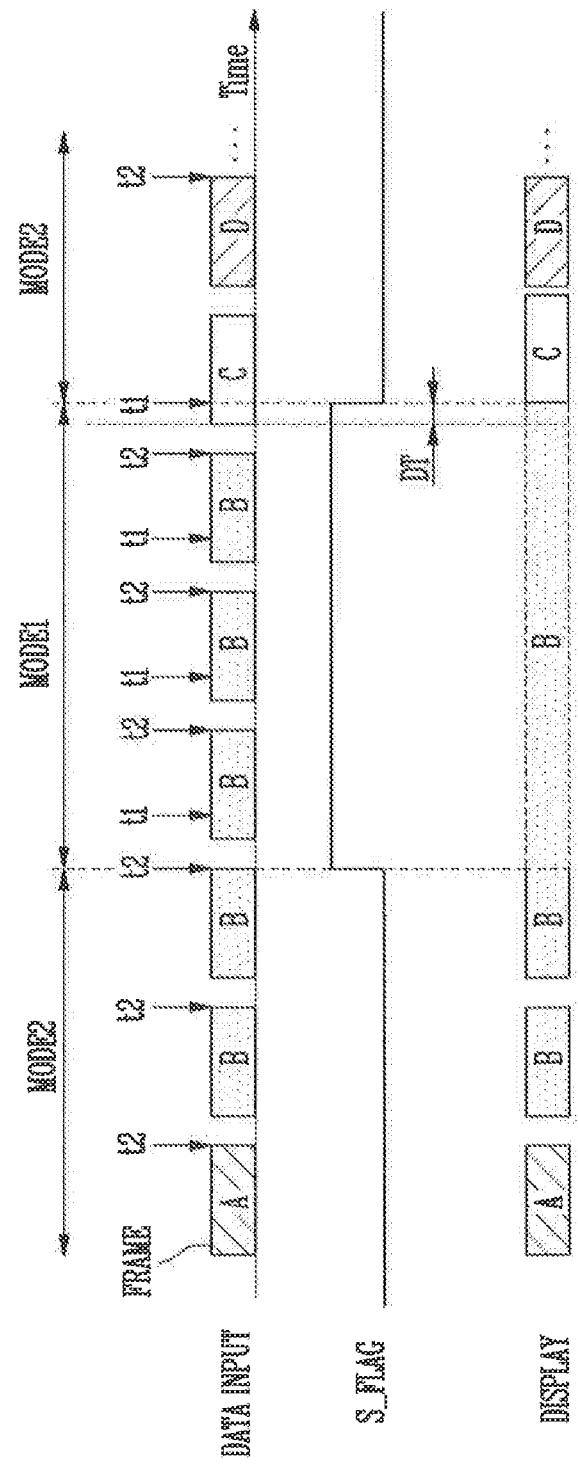
FIG. 4 is a diagram illustrating driving the display device shown in FIG. 1, according to an exemplary embodiment of the inventive concept.

FIG. 4 is a diagram illustrating driving the display device 1000 shown in FIG. 1, according to an exemplary embodiment of the inventive concept.

Referring to FIGS. 1 and 4, the display device 1000 may be driven in a first mode MODE1 or a second mode MODE2. Referring to FIG. 4, the display device 1000 is provided with image data "DATA INPUT" corresponding to images A, B, C and D and the display device 1000 outputs images A-D, for example.

In an exemplary embodiment of the inventive concept, the panel driver 300 and the display device 1000 may be driven in the first mode MODE1 in response to an activation level of the still image flag S_FLAG, and be driven in the second mode MODE2 in response to an inactivation level of the still image flag S_FLAG. As shown in FIG. 4, the activation level of the still image flag S_FLAG may be a logic high level, and the inactivation level of the still image flag S_FLAG may be a logic low level. However, this is merely illustrative, and the activation level/inactivation level of the still image flag S_FLAG is not limited thereto. For example, the activation level of the still image flag S_FLAG may be the logic low level.

In an exemplary embodiment of the inventive concept, image data IDATA of a frame unit may be supplied to the image determiner 200 and the panel driver 300 from the external graphic source. Accordingly, an image corresponding to the image data IDATA can be displayed.

In the second mode MODE2, a still image determination may be performed at a second time t2 at which all image data IDATA of one frame are supplied. In an exemplary embodiment of the inventive concept, first frame data as the entire image data of a previous frame and second frame data as the entire image data of a current frame may be compared at the second time t2. For example, a checksum of the first frame data and a checksum of the second frame data may be compared. The first frame data or the checksum of the first frame data may be temporarily stored in a memory, register or the like. The stored first frame data or the stored checksum of the first frame data may be loaded at the second time t2 of the current frame to be compared with the second frame data or the checksum of the second frame data.

When the first frame data and the second frame data are different from each other, the second mode MODE2 may be maintained. In other words, a display image is changed for each frame.

When the first frame data and the second frame data are equal to each other, the still image flag S_FLAG may be changed to the activation level, and the display device 1000 may be driven in the first mode MODE1. For example, the frequency of some scan signals output from the panel driver 300 may be decreased.

In the first mode MODE1, a still image determination may be performed at a first time t1 at which partial image data of one frame are supplied. For example, a checksum of first partial image data and a checksum of second partial image data may be compared. The checksum of the first partial image data may be temporarily stored in a memory, register or the like.

When the first partial image data and the second partial image data are equal to each other, the still image determination may be re-performed at the second time t2. In other words, when the same image is displayed in frames adjacent to each other, driving for the still image determination may be performed at least twice in one frame of the first mode MODE1.

In an exemplary embodiment of the inventive concept, the first time t1 may be a time at which image data corresponding to the kth pixel line is provided. Accordingly, each of the first partial image data and the second partial image data may include image data of the first to kth pixel lines. The time at which the driving mode of the display device 1000 is changed may become faster as k becomes smaller. For example, when k is 1, the image determiner 200 may compare only image data of the first pixel line. When the entire image including an image being scrolled is changed, whether a moving image is displayed may be determined through comparison of only the first pixel line. Accordingly, the driving mode of the display device 1000 can be rapidly switched from the first mode MODE1 to the second mode MODE2 due to the comparison of only the first pixel line.

When the first partial image data and the second partial image data are different from each other, the still image flag S_FLAG may be changed to the inactivation level, and the display device 1000 may be driven in the second mode MODE2. In other words, the display device 1000 may transition from the first mode MODE1 to the second mode MODE2. An image output may be delayed by a predetermined delay time DT to display a changed image. For example, the delay time DT may be a period from the time at which the supply of image data of one frame is started to the first time t1. For example, as shown in FIG. 4, the delay time DT may start when there is a DATA INPUT corresponding to "C" and may end at the first time t1. Thus, the delay time DT can become shorter as the compared image data become smaller, and the configuration of a buffer, register or the like for delaying the image output can be simplified.

In an existing low-frequency driving mode, whether a moving image/still image is displayed is determined by comparing the entire image data IDATA between adjacent frames. When the driving mode of the display device 1000 is switched from the low-frequency mode (e.g., the first mode MODE1) to the second mode MODE2, a time difference or discordance between image data IDATA input to the display device 1000 and an image displayed in the display device 1000 may occur, or a frame may disappear (e.g., image C shown in FIG. 4 may disappear). Therefore, there may be an error in touch recognition or a decrease in touch reaction speed, which is caused by a time difference between the time at which the image data IDATA is processed and the time at which the image data IDATA is displayed.

However, in the image determiner 200 and the display device 1000 having the same in accordance with the present embodiment, whether an image is changed can be rapidly sensed through analysis of initial image data (or partial image data) of one frame in the first mode MODE1. Thus, the driving mode of the display device 1000 can be rapidly switched from the first mode MODE1 that is a low-frequency driving mode to the second mode MODE2 in which a moving image is displayed. Accordingly, a decrease in touch reaction speed and an error in touch recognition when the driving mode of the display device 1000 is switched from the first mode MODE1 to the second mode MODE2 can be minimized.

When the driving mode of the display device 1000 is switched from the first mode MODE1 to the second mode MODE2, the output frequency of some scan signals may be again increased.

When the first partial image data and the second partial image data are equal to each other, the first frame data and second frame data may be compared at the second time t2 of a frame.

When the first frame data and the second frame data are equal to each other, the first mode MODE1 may be maintained.

When the first frame data and the second frame data are different from each other, the still image flag S_FLAG may be changed to the inactivation level, and the display device 1000 may be driven in the second mode MODE2.

Figure 5:
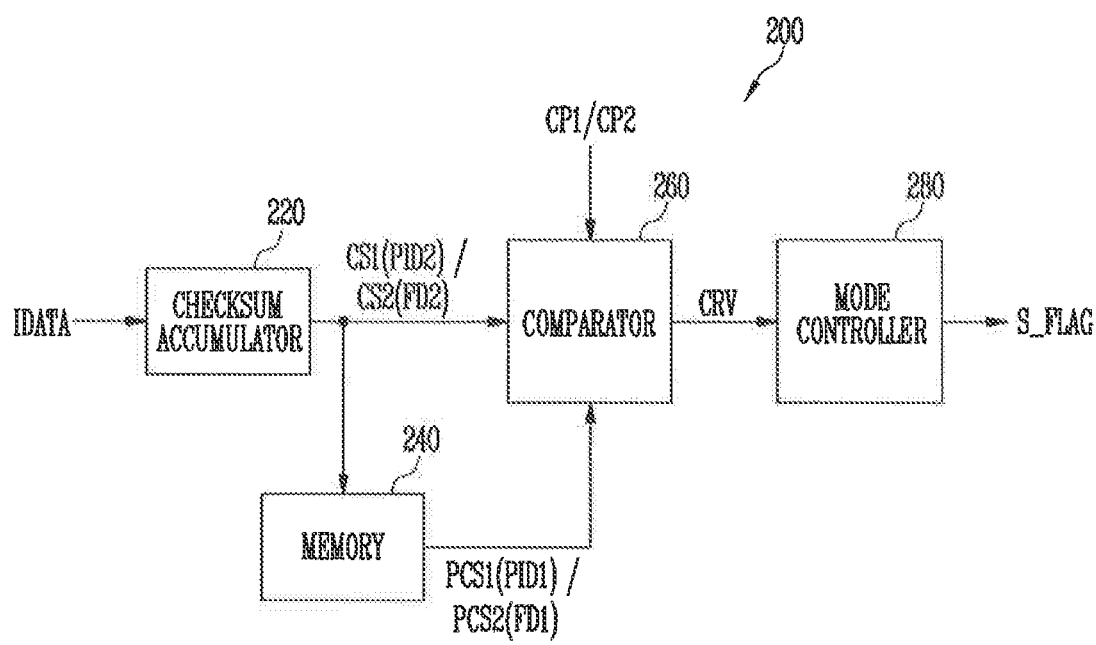
FIG. 5 is a block diagram illustrating an image determiner included in the display device shown in FIG. 1, according to an exemplary embodiment of the inventive concept.
Figure 6:
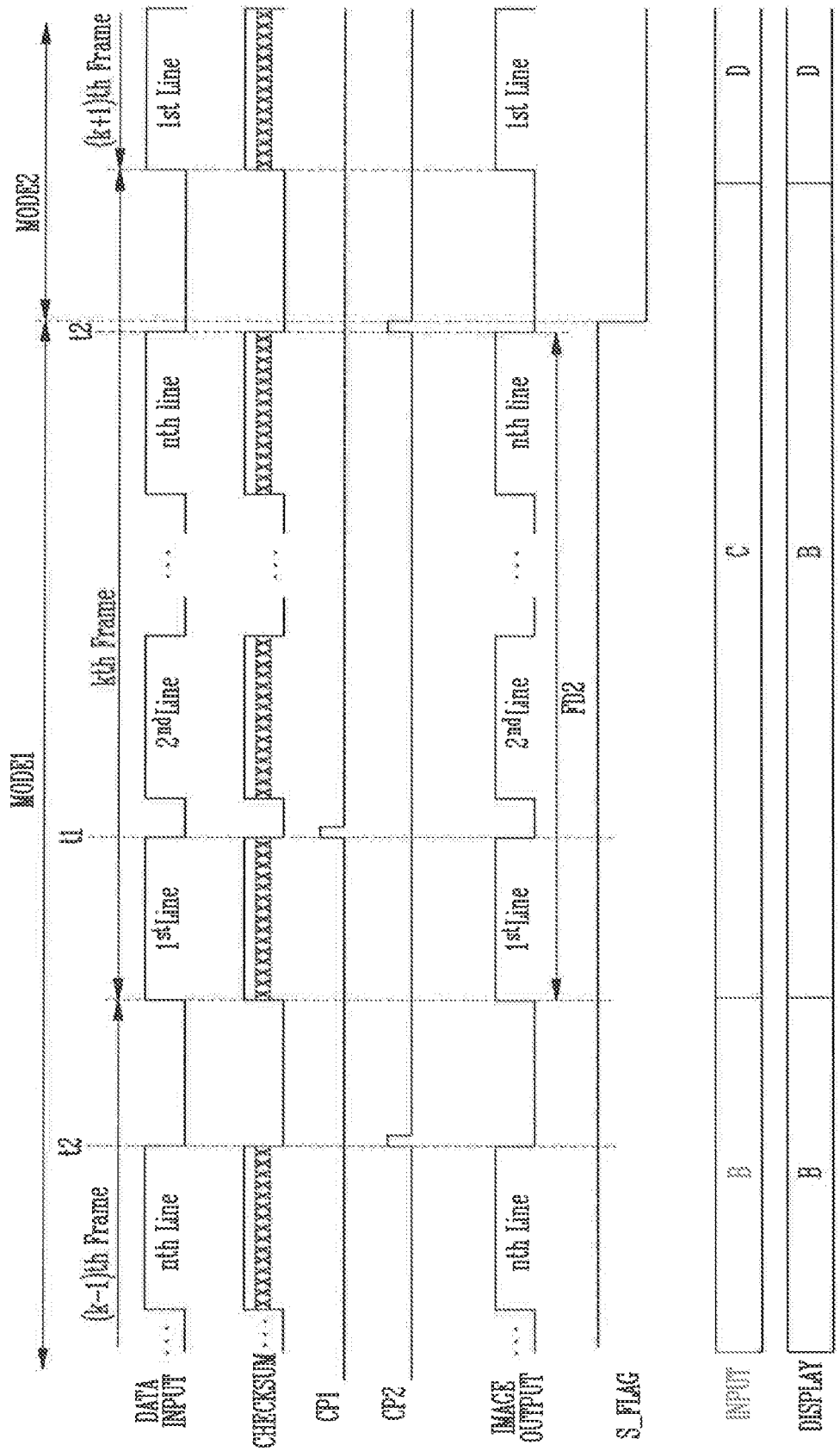
FIG. 6 is a diagram illustrating driving the display device, which is performed by the image determiner shown in FIG. 5, according to an exemplary embodiment of the inventive concept.
Figure 7:
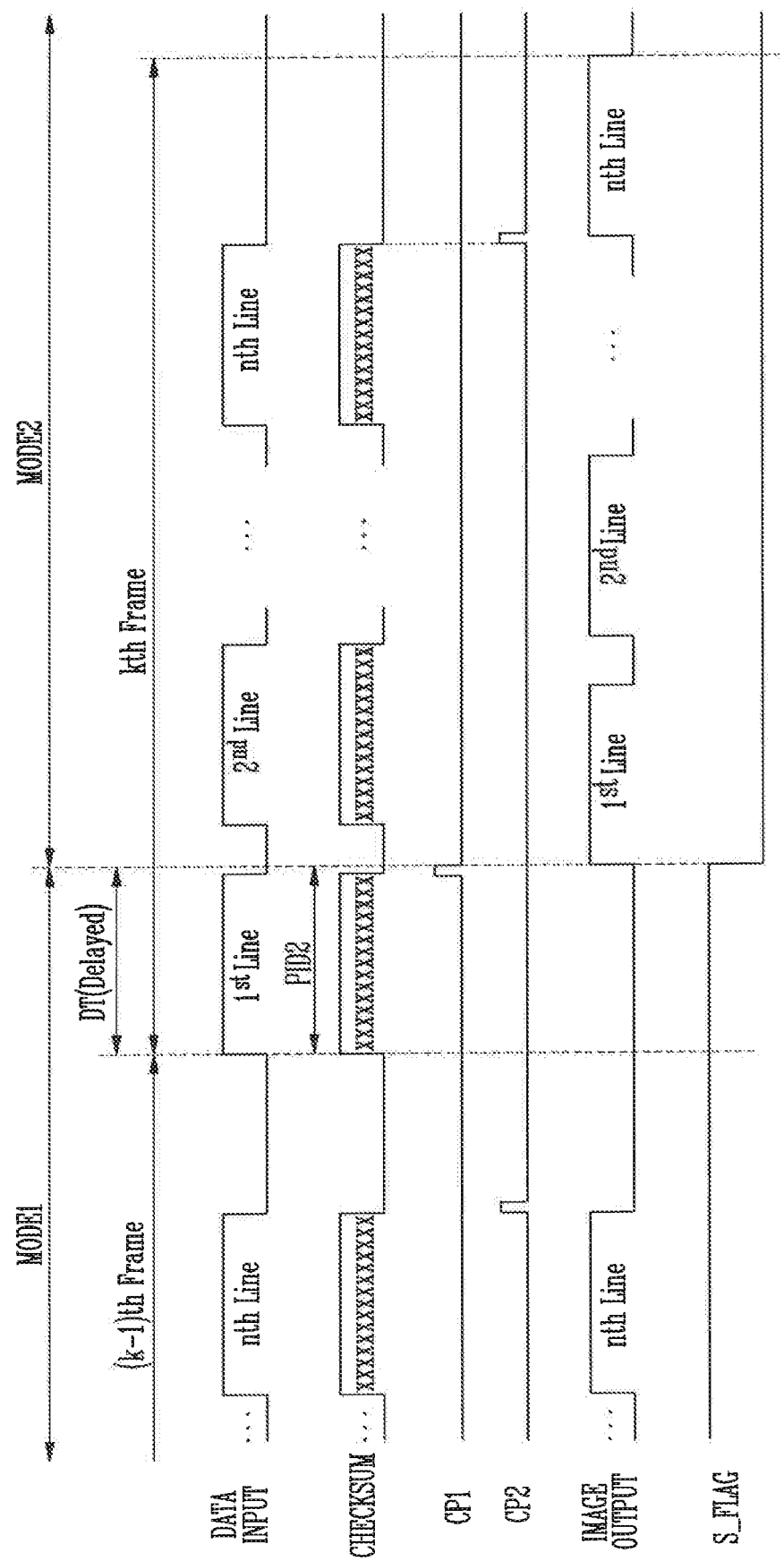
FIG. 7 is a diagram illustrating driving the display device, which is performed by the image determiner shown in FIG. 5, according to an exemplary embodiment of the inventive concept.

FIG. 5 is a block diagram illustrating the image determiner 200 included in the display device 1000 shown in FIG. 1. FIG. 6 is a diagram illustrating driving the display device 1000, which is performed by the image determiner 200 shown in FIG. 5, according to an exemplary embodiment of the inventive concept. FIG. 7 is a diagram illustrating driving the display device 1000, which is performed by the image determiner 200 shown in FIG. 5, according to an exemplary embodiment of the inventive concept.

Referring to FIGS. 1, 4, 5, 6, and 7, the image determiner 200 may include a checksum accumulator 220, a storage (e.g., memory) 240, a comparator 260, and a mode controller 280.

Hereinafter, for convenience of description, a case where first partial image data PID1 is image data accumulated at a first time t1 of a previous frame data, second partial image data PID2 is image data accumulated at a first time t1 of a current frame, first frame data FD1 is the entire image data of the previous frame, and second frame data FD2 is the entire image data of the current frame will be described.

FIGS. 6 and 7 illustrate that the second partial image data PID2 is image data of the first pixel line, and the first time t1 is a time at which the image data of the first pixel line is provided.

FIGS. 6 and 7 shows (k−1)th, kth and (k+1)th frames in the first and second modes MODE1 and MODE2, for example. In the first mode MODE1 of FIG. 6, for example, image data may be provided to the display device 1000 as "DATA INPUT" from the $1^{st}$ line to the nth line, and images may be output as "IMAGE OUTPUT" from the $1^{st}$ line to the nth line. Further, INPUT and DISPLAY may correspond to input image data B, C and D and displayed images B, B and D.

The checksum accumulator 220 may accumulate checksums CS1 and CS2 of image data IDATA of the current frame. In an exemplary embodiment of the inventive concept, the checksum accumulator 220 may accumulate each of a first checksum CS1 corresponding to the second partial image data PID2 and a second checksum CS2 corresponding to the second frame data FD2. The first checksum CS1 and the second checksum CS2 may be provided to the storage 240 and the comparator 260. The first checksum CS1 and the second checksum CS2, which are provided to the storage 240, may be loaded to the comparator 260 after one frame.

In this embodiment, a case where a data checksum is used in an image data comparison is described, but the image data comparison is not limited thereto. For example, image data for each pixel with respect to adjacent frames may be directly compared to each other.

The storage 240 may store the checksums CS1 and CS2 of the image data IDATA. For example, checksums CS1 and CS2 corresponding to one frame may be stored.

The comparator 260 may compare checksums PCS1 and PCS2 of the previous frame and checksums CS1 and CS2 of the current frame in response to comparison signals CP1 and CP2 for determining a comparison time. The comparator 260 may supply a comparison result CRV to the mode controller 280.

In an exemplary embodiment of the inventive concept, the comparator 260 may compare a first previous checksum PCS1 corresponding to the first partial image data PID1 and the first checksum CS1 corresponding to the second partial image data PID2 in response to a first comparison signal CP1. The first comparison signal CP1 may be activated at a first time t1 of each frame of the first mode MODE1.

When the first checksum CS1 and the first previous checksum PCS1 are equal to each other, the comparison result CRV of the comparator 260 may be a still image. As shown in FIG. 6, the activation level of the still image flag S_FLAG and the driving of the first mode MODE1 are maintained, and the image is not changed.

When the first checksum CS1 and the first previous checksum PCS1 are different from each other, the comparison result CRV of the comparator 260 is a moving image. As shown in FIG. 7, the still image flag S_FLAG is changed to the inactivation level, the driving mode of the display device 1000 is switched to the second mode MODE2, and the image may be changed. Additionally, an image of the current frame may be delayed by a delay time DT to be displayed.

For example, the delay time DT may be a time for which all of the image data of the first pixel line are supplied. Such a delay of image display may be implemented by a line buffer or the like, which delays an image data signal RGB provided to the data driver 380. Since a delay time DT included in one frame is very short, an image of a next frame can be rapidly displayed without frame disappearance or an addition of a large number of buffers, memories, etc.

In an exemplary embodiment of the inventive concept, the comparator 260 may compare a second previous checksum PCS2 corresponding to the first frame data FD1 and the second checksum CS2 corresponding to the second frame data FD2 in response to a second comparison signal CP2. The second comparison signal CP2 may be activated at a second time t2 of each frame of the first mode MODE1 and a second time t2 of each frame of the second mode MODE2.

When the second checksum CS2 and the second previous checksum PCS2 are equal to each other in the first mode MODE1, the comparison result CRV of the comparator 260 may be a still image. As shown in FIG. 6, the activation level of the still image flag S_FLAG and the driving of the first mode MODE1 are maintained, and the image is not changed.

When the second checksum CS2 and the second previous checksum PCS2 are different from each other in the first mode MODE1, the comparison result CRV of the comparator 260 may be a moving image. As shown in FIG. 6, the still image flag S_FLAG is changed to the inactivation level, the driving mode of the display device 1000 is switched to the second mode MODE2, and the image may be changed. In addition, an image of the current frame (e.g., image C shown in FIG. 6) may be skipped, and an image of the next frame (e.g., image D shown in FIG. 6) may be displayed by image data of the next frame.

However, this is merely illustrative, and the display device 1000 may further include a frame memory, so that the image of the current frame is delayed by one frame or more to be displayed.

When the second checksum CS2 and the second previous checksum PCS2 are different from each other in the second mode MODE2, the driving mode of the display device 1000 may maintain the second mode MODE2.

When the second checksum CS2 and the second previous checksum PCS2 are equal to each other in the second mode MODE2, the comparison result CRV of the comparator 260 may be a moving image. As shown in FIG. 4, the still image flag S_FLAG is changed to the activation level, the driving mode of the display device 1000 is switched to the first mode MODE1, and the image may be maintained. Accordingly, the display device 1000 can operate in the low-frequency driving mode.

The mode controller 280 may output a still image flag S_FLAG for determining the activation of the first mode MODE1 or the second mode MODE2, based on the comparison result CRV. The still image flag S_FLAG may be provided to the panel driver 300. In an exemplary embodiment of the inventive concept, the activation level of the still image flag S_FLAG may correspond to the first mode MODE1, and the inactivation level of the still image flag S_FLAG may correspond to the second mode MODE2.

As described above, the display device 1000 in accordance with an exemplary embodiment of the present inventive concept can rapidly sense whether an image is changed through analysis of initial image data of one frame in the first mode MODE1. Thus, the driving mode of the display device 1000 can be rapidly switched from the first mode MODE1 (e.g., the low-frequency driving mode) to the second mode MODE2 in which a moving image is displayed without disappearance of an image frame. Accordingly, when the driving mode of the display device 1000 is switched from the first mode MODE1 to the second mode MODE2, a decrease in touch reaction speed and an error in touch recognition can be minimized.

Figure 8:
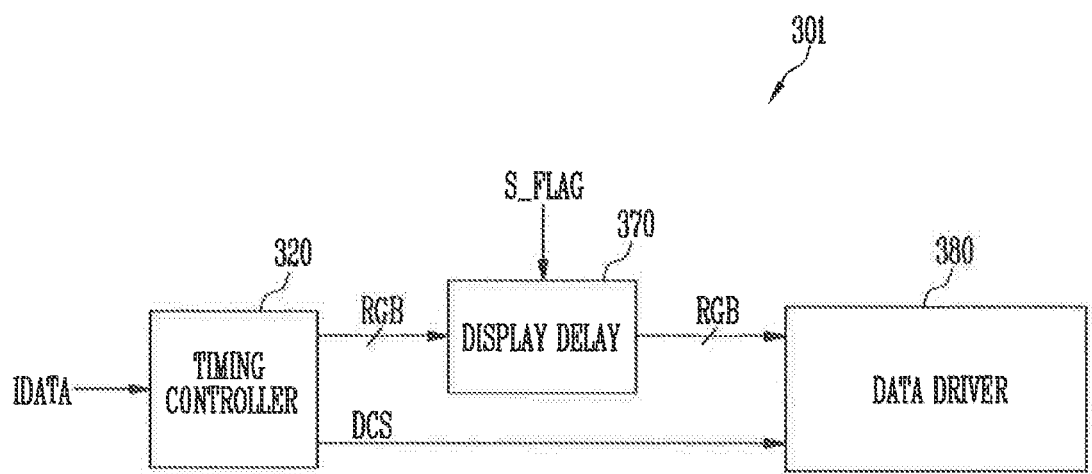
FIG. 8 is a block diagram illustrating a portion of a panel driver included in the display device shown in FIG. 1, according to an exemplary embodiment of the inventive concept.
Figure 9:
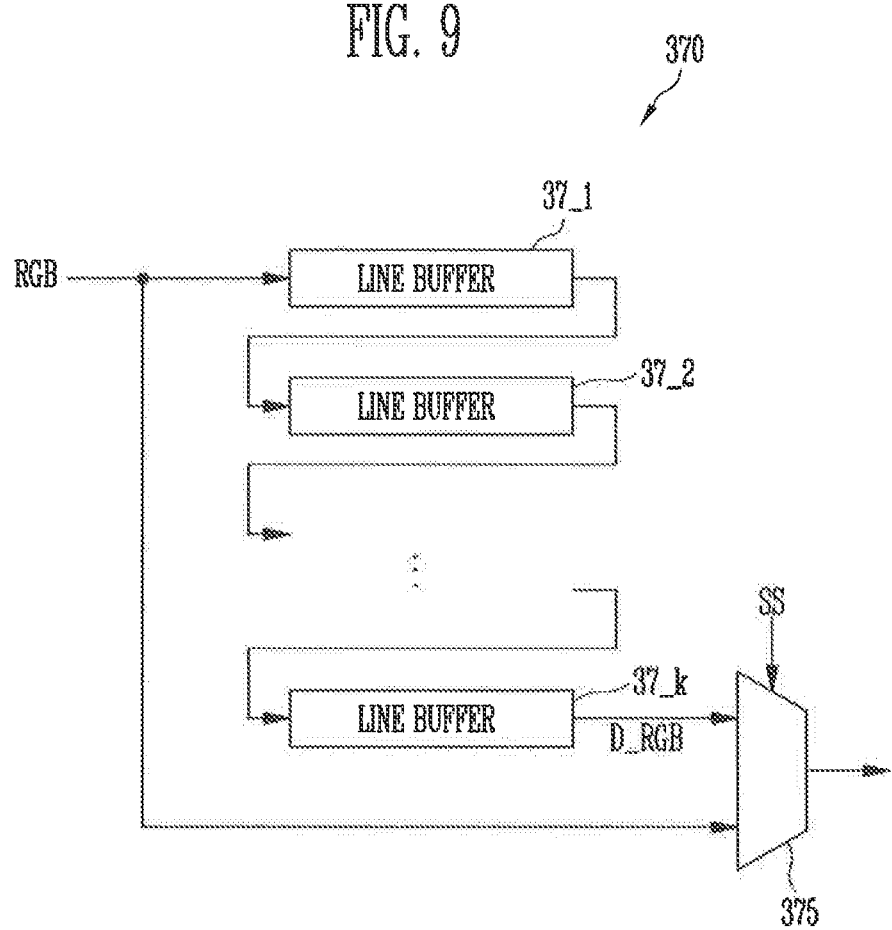
FIG. 9 is a diagram illustrating a display delay included in the panel driver shown in FIG. 8, according to an exemplary embodiment of the inventive concept.

FIG. 8 is a block diagram illustrating a portion of the panel driver included in the display device 1000 shown in FIG. 1. FIG. 9 is a diagram illustrating a display delay included in the panel driver shown in FIG. 8.

Referring to FIGS. 1 and 4 to 9, when the first partial image data PID1 and the second partial image data PID2 are different from each other in the first mode MODE1 (e.g., when the first checksum CS1 and the first previous checksum PCS1 are different from each other in the first mode MODE1) a panel driver 301 may delay the second frame data FD2 to a time posterior to the first time t1 to be output.

The panel driver 301 may include a timing controller 320, a data driver 380, and a display delay 370. The panel driver 301 may also include a scan driver and an emission driver.

The data driver 380 may convert image data IDATA (or an image data signal RGB) into a data signal, and provide the data signal to the display panel 100.

The scan driver 340 may provide a scan signal to the display panel 100 at a first frequency in the first mode MODE1, and provide a scan signal to the display panel 100 at a second frequency in the second mode MODE2. The second frequency is higher than the first frequency. In an exemplary embodiment of the inventive concept, a plurality of different scan signals may be supplied to a plurality of components included in one pixel PX, and a frequency of some of the plurality of scan signals may be changed depending on the driving mode of the display device 1000.

The display delay 370 may delay the supply of the second frame data FD2 to the data driver 380 to a time posterior to the first time t1 in response to the comparison result CRV of the first partial image data PID1 and the second partial image data PID2. For example, the display delay 370 may delay the supply of image data signal RGB received from the timing controller 320 in response to the still image flag S_FLAG. The image data signal RGB may correspond to the second frame data FD2.

Although a case where the display delay 370 receives an image data signal RGB from the timing controller 320 is illustrated in FIG. 8, the display delay 370 is not limited thereto. For example, the display delay 370 may provide image data IDATA to the timing controller 320. Alternatively, at least some components of the display delay 370 may be included in at least a portion of the data driver 380 and the timing controller 320.

As shown in FIG. 9, the display delay 370 may include a plurality of line buffers 37_1 to 37_k subordinately coupled to each other and a selector 375. Each of the line buffers 37_1 to 37_k may delay the supply of image data of one pixel line.

In an exemplary embodiment of the inventive concept, a number of the line buffers 37_1 to 37_k may be determined by the size of the first partial image data PID1 (and the second partial image data PID2). For example, when the first partial image data PID1 includes image data of first to tenth pixel lines, ten line buffers 37_1 to 37_k may be coupled. Accordingly, the image data signal RGB may be delayed by a delay time DT to be provided to the data driver 380 or the display panel 100. In an exemplary embodiment of the inventive concept, the delay time DT may correspond to a time from a start time at which image data of a current frame is provided to a time at which image data of a kth pixel line (e.g., the tenth pixel line) is provided.

The selector 375 may select and output one of a delayed image data signal D_RGB or an undelayed image data signal RGB from the line buffers 37_1 to 37_k, based on a selection signal SS. For example, the undelayed image data signal RGB may be output when the selection signal SS is not applied, and the delayed image data signal D_RGB may be output when the selection signal SS is applied.

The selection signal SS may be supplied in synchronization with the still image flag S_FLAG when the still image flag S_FLAG is changed from the activation level to the inactivation level due to the image data comparison at the first time t1. For example, the selector 375 may output the delayed image data signal D_RGB only when the first partial image data PID1 and the second partial image data PID2 are different from each other s at the first time t1.

In another exemplary embodiment of the inventive concept, driving of the line buffers 37_1 to 37_k may be controlled by a predetermined control signal. For example, the image data signal RGB may be provided to the line buffers 37_1 to 37_k only when the first partial image data PID1 and the second partial image data PID2 are different from each other at the first time t1.

As described above, when the driving mode of the display device 1000 is switched according to an initial image determination result at the first time t1 of the first mode MODE1, an image of the current frame may be output after a very short delay time DT by the display delay 370. Thus, frame disappearance when the driving mode of the display device 1000 is switched from the first mode MODE1 to the second mode MODE2 can be prevented. Further, a component such as a frame memory for delaying the entirety of one frame can be removed, and an error in touch recognition due to a display delay in a frame unit with respect to the frame memory can be minimized, FIG. 10 is a flowchart illustrating a method for driving the display device in accordance with an exemplary embodiment of the present inventive concept.

Figure 10:
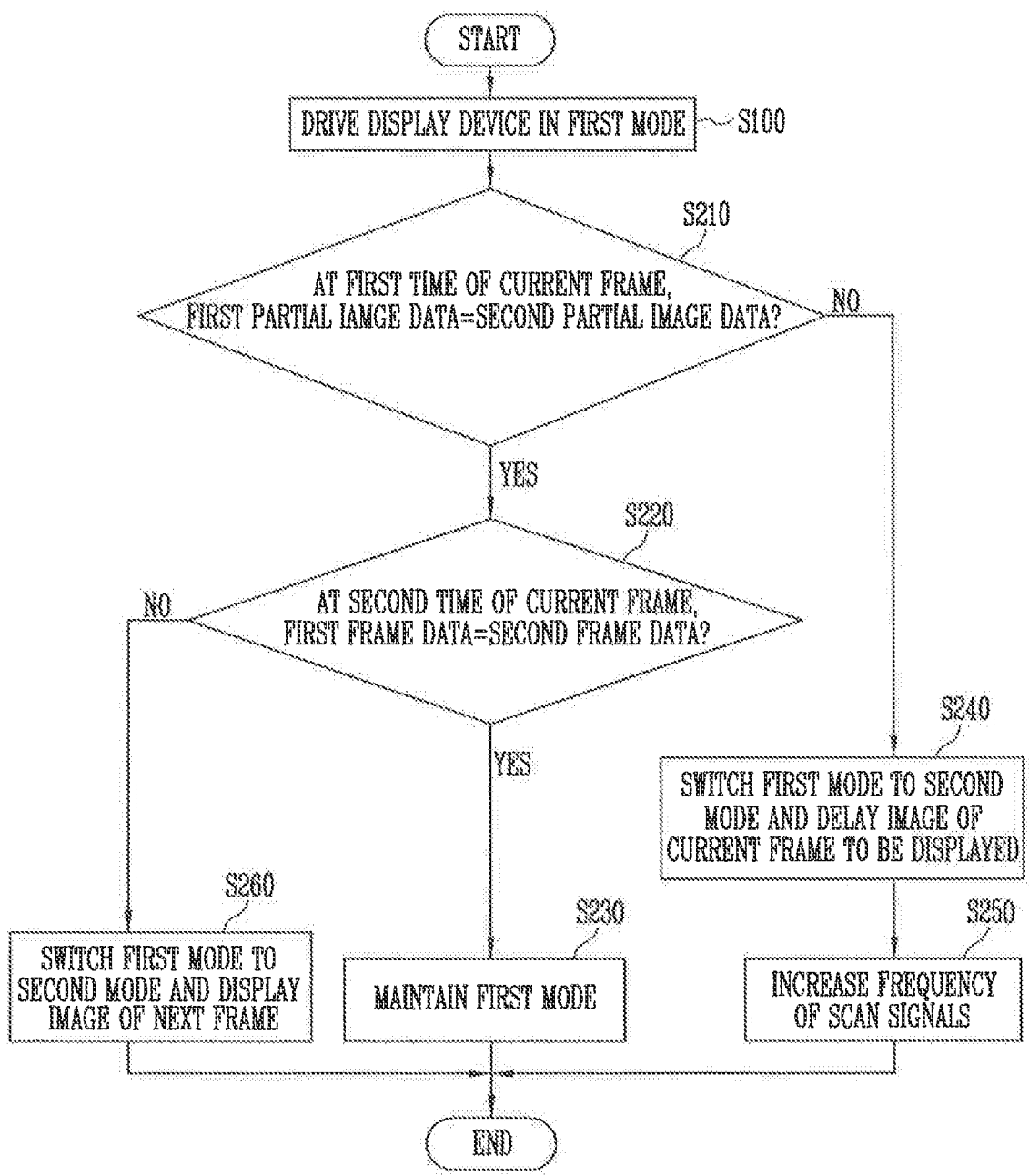
FIG. 10 is a flowchart illustrating a method for driving the display device in accordance with an exemplary embodiment of the present inventive concept.

Referring to FIG. 10, in the method, the display device 1000 may be driven in a first mode (S100), and an image may be determined by comparing first partial image data and second partial image data at a first time (S210).

In an exemplary embodiment of the inventive concept, when the first partial image data and the second partial image data are different from each other, the first mode may be switched to a second mode, and an image of a current frame may be delayed by a delay time to be displayed (S240). In addition, a frequency of some scan signals applied to a pixel, corresponding to the second mode, may be increased (S250).

In an exemplary embodiment of the inventive concept, when the first partial image data and the second partial image data are equal to each other, first frame data and second frame data may be compared at a second time of the current frame (S220). When the first frame data and the second frame data are different from each other, the first mode may be switched to the second mode such that an image of a next frame is displayed (S260).

When the first frame data and the second frame data are equal to each other, low-frequency driving of the first mode may be maintained (S230).

In an exemplary embodiment of the inventive concept, the comparison of the first partial image data and the second partial image data and the comparison of the first frame data and the second frame data may be performed by comparing accumulated checksums thereof.

Figure 11:
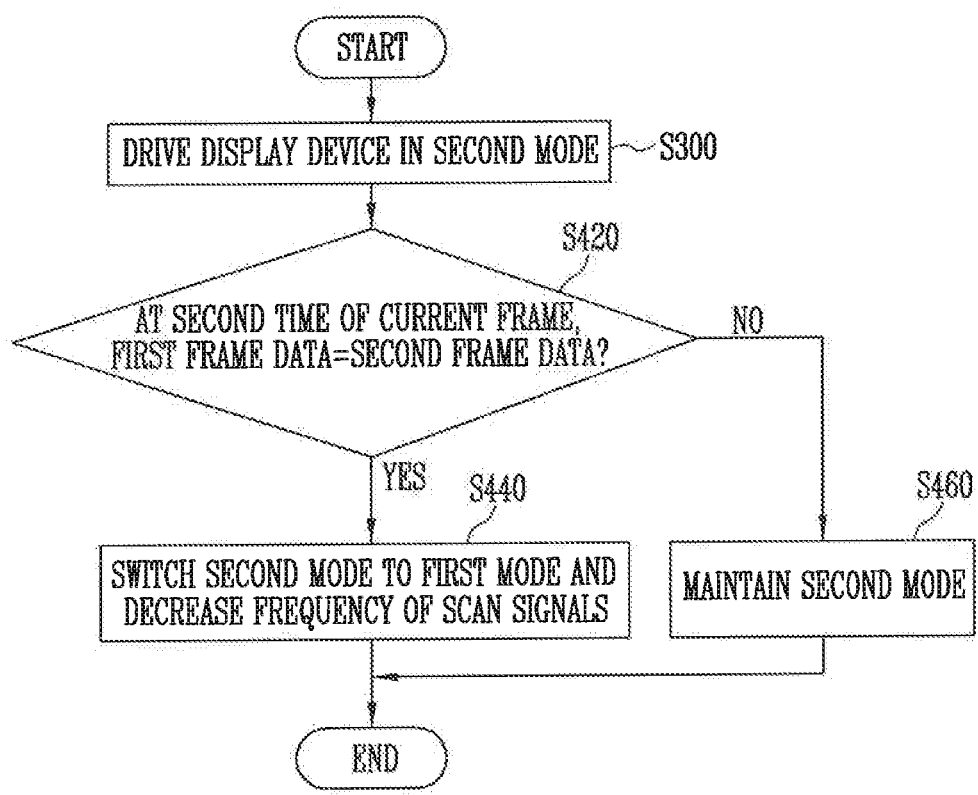
FIG. 11 is a flowchart illustrating an operation in a second mode in the method shown in FIG. 10, according to an exemplary embodiment of the inventive concept.

The driving in the first mode has been described in detail with reference to FIGS. 1 to 9, and therefore, overlapping descriptions will be omitted, FIG. 11 is a flowchart illustrating an operation in the second mode in the method shown in FIG. 10.

FIG. 11 illustrates driving in the second mode after the driving mode of the display device 1000 is switched from the first mode to the second mode, according to an exemplary embodiment of the inventive concept.

Referring to FIG. 11, in a method for driving the display device 1000, the display device 1000 may be driven in a second mode (S300), and an image may be determined by comparing first frame data and second frame data at a second time of a current frame (S420).

In an exemplary embodiment of the inventive concept, when the first frame data and the second frame data are equal to each other, the second mode may be switched to a first mode, and a frequency of some scan signals may be decreased (S440). In other words, low-frequency driving using various methods may be performed to reduce power consumption in the first mode.

When the first frame data and the second frame data are different from each other, the second mode may be maintained (S460).

The driving in the second mode has been described in detail with reference to FIGS. 1 to 9, and therefore, overlapping descriptions will be omitted.

As described above, in the display device and the method for driving the same in accordance with an exemplary embodiment of the present inventive concept, whether an image is changed can be rapidly sensed through analysis of initial image data of one frame in the first mode. Thus, when the image is changed in the first mode, the driving mode of the display device 1000 can be rapidly switched from the first mode, which is a low-frequency driving mode, to the second mode without disappearance of an image frame. Accordingly, a decrease in touch reaction speed and an error in touch recognition when the driving mode of the display device 1000 is switched from the first mode to the second mode can be minimized.

Further, a complicated memory or the like for frame delay, which may be used when the driving mode of the display device 1000 is switched from the first mode to the second mode, may not be used.

In the display device and the method for driving the same in accordance with an exemplary embodiment of the present inventive concept, whether an image is changed can be rapidly sensed through analysis of only an initial image data of a current frame in the first mode (e.g., a still image mode or low-frequency driving mode). Thus, when the image is changed in the first mode, the driving mode of the display device can be rapidly switched from the first mode to the second mode without disappearance of an image frame. Accordingly, a discordance between an image displayed in the display device and image data input to the display device when the driving mode of the display device is switched from the first mode to the second mode the can be minimized. Therefore, a decrease in touch reaction speed and an error in touch recognition can be minimized.

Further, a complicated memory or the like, which may be used for frame delay when the driving mode of the display device is switched from the first mode to the second mode, may not be used.

While the inventive concept has been particularly shown and described with reference to exemplary embodiments thereof, it will be understood by those of skill in the art that various changes in form and details may be made thereto without departing from the spirit and scope of the present inventive concept as set forth in the following claims,

What is claimed is:

1. A display device, comprising:
   an image determiner configured to receive image data in frames, determine whether a still image is displayed by comparing first partial image data that is a portion of image data of a previous frame with second partial image data that is a portion of image data of a current frame at a first time of a first mode in which a non-moving image is displayed, and determine whether the still image is displayed by comparing first frame data that is all image data of a previous frame with second frame data that is all image data of a current frame at a second time of a second mode in which a moving image is displayed;
   a display panel including pixels that receive a data signal corresponding to the image data received by the image determiner; and
   a panel driver configured to change a frequency at which the pixels are driven according to the first and second modes,
   wherein, when the first partial image data and the second partial image data are equal to each other in the first mode, the image determiner determines again whether the still image is displayed by comparing all of the image data of the current frame and all image data of the previous frame at a second time of the first mode, the first time and the second time of the first mode occurring in one frame of the first mode, and
   wherein the image determiner includes a checksum accumulator, a comparator and a memory.

2. The display device of claim 1, wherein the display panel includes n (n is a natural number) pixel lines, wherein the first partial image data and the second partial image data correspond to first to kth (k is a natural number smaller than n) pixel lines.

3. The display device of claim 1, wherein the first partial image data and the second partial image data correspond to a first pixel line.

4. The display device of claim 1, wherein the display panel includes n (n is a natural number) pixels, wherein the first partial image data and the second partial image data correspond to first to kth (k is a natural number smaller than n) pixels.

5. The display device of claim 1, wherein, when the first partial image data and the second partial image data are different from each other in the first mode, the image determiner switches the first mode to the second mode, and the panel driver delays the second frame data for a predetermined time.

6. The display device of claim 5, wherein the panel driver increases an output frequency of at least some of a plurality of scan signals applied to each of the pixels in the second mode.

7. The display device of claim 5, wherein a time at which the second mode is activated and a start time at which an image corresponding to the second frame data is displayed are synchronized with each other.

8. The display device of claim 1, wherein, when the first frame data and the second frame data are different from each other in the first mode, the image determiner switches the first mode to the second mode.

9. The display device of claim 1, wherein the first time corresponds to a time at which the second partial image data in the current frame is provided to the image determiner.

10. The display device of claim 1, wherein the second time of the second mode corresponds to a time at which all of the second frame data are provided to the image determiner.

11. The display device of claim 1, wherein the image determiner includes:
    the checksum accumulator configured to accumulate a checksum of the image data of the current frames;
    the memory configured to store a checksum of the image data of the previous frames;
    the comparator configured to compare a checksum of the first partial image data with a checksum of the second partial image data at the first time of the first mode, and compare a checksum of the first frame data and a checksum of the second frame data at the second time of the first mode and the second time of the second mode; and
    wherein a still image flag for determining activation of the first mode or the second mode is generated based on the comparison result.

12. The display device of claim 11, wherein the panel driver is driven in the first mode in response to an activation level of the still image flag, and is driven in the second mode in response to an inactivation level of the still image flag.

13. The display device of claim 11, wherein the panel driver includes:
    a data driver configured to convert the image data into the data signal, and provide the data signal to the display panel;
    a scan driver configured to provide a scan signal to the display panel at a first frequency in the first mode, and provide the scan signal to the display panel at a second frequency higher than the first frequency in the second mode; and
    at least one buffer configured to delay the supply of the second frame data to the data driver for a predetermined time in response to the comparison result of the first partial image data and the second partial image data.

14. The display device of claim 13, wherein the at least one buffer is configured to receive the image data and provide the image data to the data driver.

15. A display device, comprising:
    a display panel including pixels;
    an image determiner configured to compare first partial image data of a previous frame with second partial image data of a current frame, at a first time of the current frame, in a first mode in which a still image is displayed; switch the first mode to a second mode in which a moving image is displayed when the first partial image data and the second partial image data are different from each other, and delay an image of the current frame to be displayed by a predetermined time; and a driver configured to increase a frequency of first scan signals applied to the pixels in response to a switch from the first mode to the second mode, wherein the image determiner is further configured to compare, at a second time of the current frame, all image data of the previous frame with all image data of the current frame when the first partial image data and the second partial image data are the same, and wherein the image determiner includes a checksum accumulator, a comparator and a memory.

16. The display device of claim 15, wherein the predetermined time is a period from a time at which the supply of image data of the current frame is started to the first time.

* * * * *